United States Patent
Zettsu et al.

(10) Patent No.: US 11,387,445 B2
(45) Date of Patent: Jul. 12, 2022

(54) POSITIVE ELECTRODE FOR LITHIUM-ION RECHARGEABLE BATTERY, LITHIUM-ION RECHARGEABLE BATTERY, AND METHOD FOR PRODUCING POSITIVE ELECTRODE FOR LITHIUM-ION RECHARGEABLE BATTERY

(71) Applicants: SHINSHU UNIVERSITY, Nagano (JP); MEIJO NANO CARBON CO., LTD., Nagoya (JP)

(72) Inventors: Nobuyuki Zettsu, Nagano (JP); Katsuya Teshima, Nagano (JP); Daewook Kim, Nagano (JP)

(73) Assignees: SHINSHU UNIVERSITY, Nagano (JP); MEIJO NANO CARBON CO., LTD., Nagoya (JP)

( * ) Notice: Subject to any disclaimer, the term of this patent is extended or adjusted under 35 U.S.C. 154(b) by 0 days.

(21) Appl. No.: 17/275,032

(22) PCT Filed: Nov. 22, 2019

(86) PCT No.: PCT/JP2019/045732
§ 371 (c)(1),
(2) Date: Mar. 10, 2021

(87) PCT Pub. No.: WO2020/105729
PCT Pub. Date: May 28, 2020

(65) Prior Publication Data
US 2021/0313559 A1 Oct. 7, 2021

(30) Foreign Application Priority Data
Nov. 22, 2018 (JP) .............................. JP2018-219707

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/625* (2013.01);
(Continued)

(58) Field of Classification Search
None
See application file for complete search history.

(56) References Cited

U.S. PATENT DOCUMENTS

2013/0248772 A1    9/2013  Jo
2014/0332731 A1*   11/2014 Ma .......................... H01M 4/13
                                                              252/506

(Continued)

FOREIGN PATENT DOCUMENTS

CN    103000885 A    3/2013
CN    108511674 A    9/2018
(Continued)

OTHER PUBLICATIONS

PCT Search Report and Written Opinion prepared for PCT/JP2019/045732, completed Feb. 13, 2020.
(Continued)

*Primary Examiner* — Gregg Cantelmo
(74) *Attorney, Agent, or Firm* — Barnes & Thornburg LLP

(57) ABSTRACT

There is provided a positive electrode for a lithium-ion rechargeable battery in which it is possible to achieve both exceptional electrical conductivity and adhesion of an electrode active material to a current collector and it is possible to dramatically improve battery characteristics compared to those in the related art. A positive electrode for a lithium-ion rechargeable battery includes a current collector; and an electrode active material-containing layer provided on the current collector, wherein the electrode active material-containing layer contains active material particles and a
(Continued)

conductive material that connects the active material particles to each other; wherein the mass ratio of the active material particles:the conductive material:other components in the electrode active material-containing layer is 95 to 99.7:0.3 to 5:0 to 1, wherein the conductive material includes a first elongated carbon material having a first length and a second elongated carbon material having a second length larger than the first length, and wherein the ratio of the second length to the first length is 2 or more and 50 or less.

4 Claims, 10 Drawing Sheets

(51) Int. Cl.
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2015/0037673 A1* | 2/2015 | Zaghib | H01M 4/1391 |
| | | | 429/221 |
| 2018/0090762 A1* | 3/2018 | Mizuno | H01M 4/62 |
| 2018/0248195 A1 | 8/2018 | Choi | |

FOREIGN PATENT DOCUMENTS

| | | |
|---|---|---|
| JP | 2014-035866 | 2/2014 |
| JP | 2018-097961 | 6/2018 |
| JP | 2018-523902 | 8/2018 |
| KR | 101113976 B1 | 3/2012 |
| WO | WO2012/127790 | 9/2012 |

OTHER PUBLICATIONS

Kei Hasegawa et al., Journal of Power Sources, 2016, vol. 321, pp. 155-162.
Office Action issued in CN 201980060022.8, dated Aug. 24, 2021.
Office Action issued KR 10-2021-7007562, dated Aug. 30, 2021.

* cited by examiner (a)

(b)

POSITIVE ELECTRODE FOR LITHIUM-ION RECHARGEABLE BATTERY, LITHIUM-ION RECHARGEABLE BATTERY, AND METHOD FOR PRODUCING POSITIVE ELECTRODE FOR LITHIUM-ION RECHARGEABLE BATTERY

CROSS-REFERENCE TO RELATED APPLICATIONS

This application is the U.S. national phase of PCT/JP2019/045732, filed on Nov. 22, 2019, which claims the benefit of Japanese Patent Application Serial Number 2018-219707, filed on Nov. 22, 2018, the entire disclosures of both which are incorporated herein by reference.

TECHNICAL FIELD

The present invention relates to a positive electrode for a lithium-ion rechargeable battery, a lithium-ion rechargeable battery and a method for producing a positive electrode for a lithium-ion rechargeable battery.

Priority is claimed on Japanese Patent Application No. 2018-219707, filed Nov. 22, 2018, the content of which is incorporated herein by reference.

BACKGROUND ART

In recent years, a high output and high energy density of built-in lithium-ion rechargeable batteries have been required for high performance of mobile devices. A lithium-ion rechargeable battery is composed of a positive electrode, a negative electrode, an electrolytic solution, and a separator, and in order to increase the output of the battery, it is necessary to reduce the resistance of components. Since the main components of which resistance is to be reduced are a positive electrode and a negative electrode, various studies have been conducted on materials such as an electrode active material particle powder, a conductive material, a binder, and a current collector which constitute the electrode.

In the related art, in order to produce an electrode for a lithium-ion rechargeable battery, a method in which a non-aqueous solvent electrode-forming slurry is applied onto a current collector, dried and mechanically pressure-bonded, and an electrode active material-containing layer is formed on a current collector is used. For example, Patent Literature 1 discloses a lithium-ion rechargeable battery which includes a positive electrode containing a non-aqueous electrolytic solution containing a lithium salt and a composite oxide containing manganese as an active material in a non-aqueous solvent which contains 15 to 40 volume % of a fluorine-containing cyclic carbonate and a total amount of 45 to 85 volume % of a fluorine-containing chain carbonate and/or fluorine-containing chain ether, and in which the content of a fluorine-free cyclic carbonate is 10 volume % or less. In Patent Literature 1, a positive electrode slurry containing a binder such as polyvinylidene fluoride (PVDF) is applied to one surface of a current collector made of an aluminum foil by a bar coater, the current collector to which the positive electrode slurry is applied is dried, the obtained sheet-like positive electrode is compressed and molded using a roll press and then dried to obtain a positive electrode.

In addition, attempts have been made to process an electrode active material particle powder on an electrode current collector without using a binder. For example, Patent Literature 2 discloses a thin-film electrode in which a Persian blue cyano crosslinked metal complex as a positive electrode active material is electrolytically deposited on a metal surface of a current collector for a positive electrode.

On the other hand, there is also a method of fixing an electrode active material particle powder with a network including a plurality of fibers without using a binder or a metal for a current collector. For example Non Patent Literature 1 discloses a non-woven electrode obtained by ultrasonically dispersing carbon nanotubes with a fiber diameter of 11 nm, a fiber length of 370 μm, an electrode active material particle powder, and a solvent, and performing filtering and drying.

However, in the technology of Patent Literature 1, since an insulating binder is used in the substance constituting the electrode, high resistance of the electrode is unavoidable, and when no binder is used, there is a problem of adhesion between the current collector and the active material particle being insufficient. In addition, the technology of Patent Literature 2 has problems that the cost of electrolytic deposition is high, it is not possible to apply a large amount of an active material to the electrode due to a thin-film form, and the energy density cannot be increased. In the technology of Non Patent Literature 1, there is provided a production method in which a cake on a filter of a filtration device is dried and collected as an electrode, but there is a problem that it is difficult to produce large-area electrodes in large quantities. In addition, when the non-woven electrode obtained for securing conductivity and a metal support are bonded to each other, a sufficient bonding strength cannot be obtained even if they are mechanically pressure-bonded. Therefore, it cannot be said that sufficient battery characteristics can be obtained.

CITATION LIST

Patent Literature

[Patent Literature 1]
Japanese Unexamined Patent Application, First Publication No. 2014-035866
[Patent Literature 2]
PCT International Publication No. WO 2012/127790

Non Patent Literature

[Non Patent Literature 1]
Kei Hasegawa, Suguru Noda, Journal of Power Sources, 2016, Vol. 321, pp 155-162

SUMMARY OF INVENTION

Technical Problem

An object of the present invention is to provide a positive electrode for a lithium-ion rechargeable battery, a lithium-ion rechargeable battery and a method for producing a positive electrode for a lithium-ion rechargeable battery through which it is possible to achieve both exceptional electrical conductivity and adhesion of an electrode active material and it is possible to improve battery characteristics compared to those in the related art.

Solution to Problem

The inventors conducted extensive studies, and as a result, found that, when an electrode active material-containing layer is formed on a current collector constituting a positive electrode, if an electrode-forming slurry contains carbon nanotubes having different lengths, short carbon nanotubes that contribute to formation of a reticulated network structure that connects active material particles to each other and elongated carbon nanotubes that contribute to formation of continuous electron conduction paths with low resistance can be distributed in the electrode active material-containing layer, and thus electrical conductivity is improved, and high adhesion between the active material particles and sufficient adhesion of the active material particles to the current collector are exhibited. In addition, it is found that, since it is not necessary to incorporate a binder into the electrode active material-containing layer, the proportion of the active material particles in the electrode active material-containing layer can be increased to the maximum, and the energy density of the lithium-ion rechargeable battery can be further increased.

Specifically, main configurations of the present invention are as follows.

[1] A positive electrode for a lithium-ion rechargeable battery, including:

a current collector; and an electrode active material-containing layer provided on the current collector, wherein the electrode active material-containing layer contains active material particles and a conductive material that connects the active material particles to each other;

wherein the mass ratio of the active material particles:the conductive material:other components in the electrode active material-containing layer is 95 to 99.7:0.3 to 5:0 to 1, wherein the conductive material includes a first elongated carbon material having a first length and a second elongated carbon material having a second length larger than the first length, and wherein the ratio of the second length to the first length is 2 or more and 50 or less.

[2] The positive electrode for a lithium-ion rechargeable battery according to [1], wherein the first elongated carbon material is composed of first carbon nanotubes which are multi-walled carbon nanotubes, wherein the second elongated carbon material is composed of second carbon nanotubes which are single-walled carbon nanotubes, and wherein the mass ratio of the first carbon nanotubes:the second carbon nanotubes is 85 to 99:1 to 15.

[3] The positive electrode for a lithium-ion rechargeable battery according to [1], wherein the first elongated carbon material connects a plurality of primary particles constituting one secondary particle in the active material particles and connects a plurality of primary particles constituting adjacent secondary particles to each other, and wherein the second elongated carbon material is disposed to straddle between a plurality of primary particles constituting a plurality of secondary particles in the active material particles and connects the secondary particles to each other.

[4] A lithium-ion rechargeable battery comprising the positive electrode for a lithium-ion rechargeable battery according to any one of [1] to [3], a negative electrode, and an electrolyte.

[5] A method for producing a positive electrode for a lithium-ion rechargeable battery, including:

a process of preparing a conductive material which includes a first elongated carbon material having a first length and a second elongated carbon material having a second length different from the first length and has a ratio of the second length larger than first length that is 2 or more and 50 or less; and a process of forming an electrode active material-containing layer by applying an electrode-forming material containing the conductive material and active material particles to a current collector.

[6] The method for producing a positive electrode for a lithium-ion rechargeable battery according to [5], wherein the first elongated carbon material is composed of first carbon nanotubes which are multi-walled carbon nanotubes, wherein the second elongated carbon material is composed of second carbon nanotubes which are single-walled carbon nanotubes, and wherein the mass ratio of the first carbon nanotubes:the second carbon nanotubes is 85 to 99:1 to 15.

[7] The method for producing a positive electrode for a lithium-ion rechargeable battery according to [5] or [6], wherein the electrode active material-containing layer is formed using an electrode-forming material that does not contain a binder.

Advantageous Effects of Invention

According to the present invention, it is possible to provide a positive electrode for a lithium-ion rechargeable battery, a lithium-ion rechargeable battery and a method for producing a positive electrode for a lithium-ion rechargeable battery through which it is possible to achieve both exceptional electrical conductivity and adhesion of an electrode active material to a current collector and it is possible to improve battery characteristics compared to those in the related art.

DESCRIPTION OF EMBODIMENTS

Figure 1:
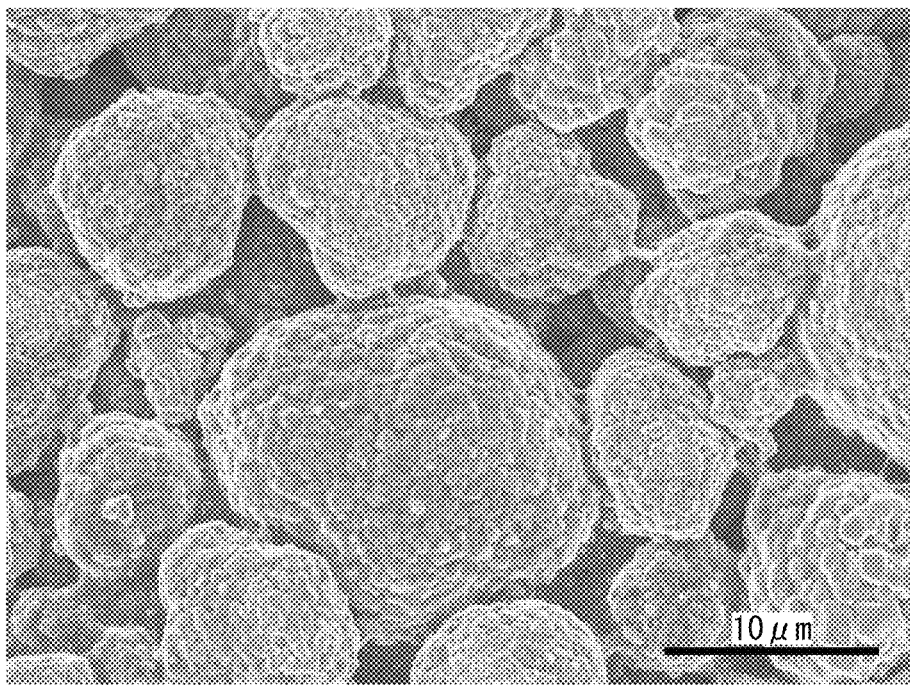
FIG. 1(a) is an example of an electron microscope image of an electrode active material-containing layer constituting a positive electrode for a lithium-ion rechargeable battery according to an embodiment of the present invention.
FIG. 1(b) is an enlarged image thereof.
Figure 1:
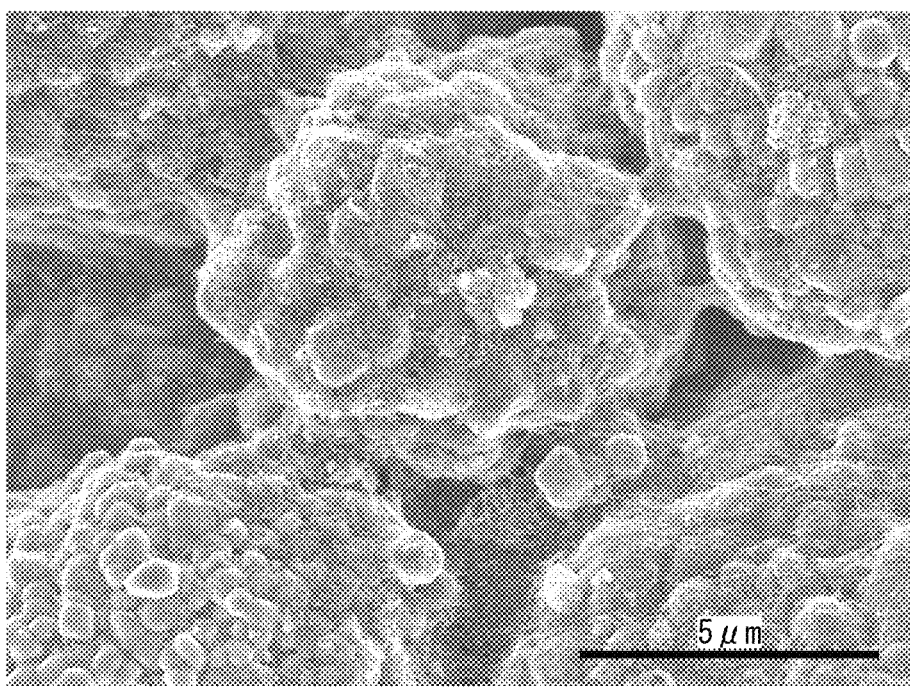

Hereinafter, embodiments of the present invention will be described in detail with reference to the drawings.

[Configuration of Positive Electrode for Lithium-Ion Rechargeable Battery]

A positive electrode for a lithium-ion rechargeable battery according to the present embodiment includes a current collector and an electrode active material-containing layer provided on the current collector.

<Current Collector>

The current collector is made of, for example, a metal foil. The metal foil is suitably used for batteries having various shapes such as cylindrical shape, a square shape, and a laminated shape. In order to further improve adhesion between the electrode active material and the current collector, carbon may be vapor-deposited on the surface of the current collector.

For a current collector on the side of the positive electrode, for example, an aluminum foil can be used. The current collector is preferably hydrophilized by a surface treatment. When the surface of the current collector is hydrophilized, hydrogen bonds are easily formed when an electrode-forming slurry is dried, and an electrode having high adhesive strength can be obtained. Examples of hydrophilization treatments on the surface of the current collector include a method (UV/$O_3$ treatment) of emitting ultraviolet rays (UV) in an ozone ($O_3$) atmosphere.

<Electrode Active Material-Containing Layer>

As shown in FIG. 1(a) and FIG. 1(b), the electrode active material-containing layer includes active material particles and a conductive material that connects the active material particles to each other.

The mass ratio (mass %) of active material particles: conductive material:other components in the electrode active material-containing layer is 95 to 99.7:0.3 to 5:0 to 1, preferably 98 to 99.7:0.3 to 2:0 to 1, and more preferably 99 to 99.7:0.3 to 1:0 to 1. Since the mass ratio of the active material particles is very high at 95 to 99.7, it is possible to extremely increase the capacity per mass of the lithium-ion rechargeable battery.

(Active Material Particle)

Active material particles are composed of a composite oxide containing a transition metal to be described below and lithium. The behavior particle size of the active material particles is preferably 0.1 μm or more and 30 μm or less and more preferably 1 μm or more and 10 μm or less. When the behavior particle size of the active material is less than 0.1 μm, this is not preferable because the number of particles of the active material per unit volume in the positive electrode increases and the peeling strength decreases. When the behavior particle size of the active material exceeds 10 μm, it becomes difficult to increase the capacity of the battery. It is preferable to reduce impurities in advance by washing with water or the like so that the pH of the electrode-forming slurry does not increase.

Examples of positive electrode active material particles include lithium cobalt oxide $LiCoO_2$ having a layered structure, a lithium nickelate $LiNiO_2$ having the same structure, lithium manganate $LiMn_2O_4$ having a spinel structure, lithium iron phosphate $LiFePO_4$ having an olivine structure, or its solid solution layered structure $Li(Ni, Mn, Co)O_2$, a layered structure $Li(Ni, Al, Co)O_2$, $LiNi_{0.5}Mn_{1.5}O_4$ having a spinel structure. However, the active material particles in the present invention are not particularly limited as long as they can reversibly occlude and release Li, and known particles can be used.

(Conductive Material)

The conductive material includes a first elongated carbon material having a first length and a second elongated carbon material having a second length larger than the first length. It is preferable that the first elongated carbon material connect a plurality of primary particles constituting one secondary particle in the active material particles and connect a plurality of primary particles constituting adjacent secondary particles to each other. In addition, it is preferable that the second elongated carbon material be disposed to straddle between a plurality of primary particles constituting a plurality of secondary particles in the active material particles and connect the secondary particles to each other.

The first elongated carbon material is composed of, for example, short first carbon nanotubes, and the second elongated carbon material is composed of, for example, elongated second carbon nanotubes. In the enlarged image in FIG. 1(b), short first carbon nanotubes are densely distributed so that they cover particle gaps between a plurality of primary particles constituting one secondary particle in the active material particles and part of the surfaces of the plurality of primary particles and densely self-aggregate in a bundle form in particle gaps between a plurality of primary particles constituting a plurality of adjacent secondary particles. In addition, elongated second carbon nanotubes that extend from the surface of active material particles in a thread form are sparsely distributed and densely self-aggregate in particle gaps between a plurality of adjacent secondary particles. The first and second carbon nanotubes can also be referred to as a conductivity aid.

The ratio of the second length to the first length is 2 or more and 50 or less, preferably 7 or more and 34 or less, more preferably 7 or more and 20 or less, and still more preferably 5 or more and 15 or less.

When the ratio of the second length to the first length is less than 2, improvement in electrical conductivity is not sufficient, and when the ratio of the second length to the first length exceeds 50, dispersibility of carbon nanotubes decreases. Therefore, the ratio of the second length to the first length is set as value within the above range.

The first length of the first carbon nanotube is 0.2 μm or more and 1.0 μm or less, and preferably 0.3 μm or more and 0.7 μm or less, and the diameter thereof is 0.01 μm or more and 0.04 μm or less. In addition, the second length of the second carbon nanotube is 2.0 μm or more and 10 μm or less, preferably 5 μm or more and 10 μm or less, and more preferably 5 μm or more and 7 μm or less, and the diameter thereof is 0.001 μm or more and 0.005 μm or less.

Preferably, the first elongated carbon material is composed of first carbon nanotubes which are multi-walled carbon nanotubes (hereinafter referred to as MWCNT), and the second elongated carbon material is composed of second carbon nanotubes, which are single-walled carbon nanotubes (hereinafter referred to as SWCNT). However, both the first carbon nanotube and the second carbon nanotube may be composed of multi-walled carbon nanotubes.

In this case, the mass ratio (mass %) of the first carbon nanotubes:the second carbon nanotubes is preferably 85 to 99:1 to 15. More specifically, when the mass ratio of active material particles in the electrode active material-containing layer is 95 mass % or more and less than 99.5 mass %, the mass ratio of the first carbon nanotubes:the second carbon nanotubes is more preferably 90 to 99:1 to 10. In addition, when the mass ratio of active material particles in the electrode active material-containing layer is 99.5 mass % or more and 99.7 mass % or less, the mass ratio of the first carbon nanotubes:the second carbon nanotubes is more preferably 85 to 90:10 to 15.

When carbon nanotubes are used as a conductive material and a binding agent, the temperature (TDTA) of a first exothermic peak in differential thermal analysis is preferably 530° C. or higher. In the differential thermal analysis of carbon nanotubes, combustion decomposition of carbon nanotubes occurs at a temperature indicating the first exothermic peak. Therefore, it is considered that carbon nanotubes with a lower first exothermic peak temperature in differential thermal analysis are carbon nanotubes that are more likely to be combusted and decomposed. When a catalyst used for synthesis of carbon nanotubes remains, the periphery of metal particles is selectively oxidized and easily combusted, and thus the TDTA tends to be low. In addition, in carbon nanotubes with many exposed tube ends such as a cup stack, the TDTA tends to be low because oxidation and combustion proceed at once.

The first carbon nanotube preferably has a specific surface area of larger than 100 $m^2/g$ and less than 750 $m^2/g$, determined by a BET method. When the specific surface area is 100 $m^2/g$ or less, this is not preferable because it is difficult to impart conductivity over a wide range. In addition, when the specific surface area is 750 $m^2/g$ or more, this is not preferable because aggregation easily occurs and it is difficult to maintain a dispersed state in the electrode-forming slurry. A more preferable range is larger than 105 $m^2/g$ and less than 600 $m^2/g$, and a still more preferable range is larger than 110 $m^2/g$ and less than 500 $m^2/g$.

In the second carbon nanotube, the specific surface area determined by the BET method is preferably larger than 100 $m^2/g$ and less than 1,000 $m^2/g$. When the specific surface area is 100 $m^2/g$ or less, this is not preferable because it is difficult to impart conductivity over a wide range. In addition, when the specific surface area is 1,000 $m^2/g$ or more, this is not preferable because aggregation easily occurs and it is difficult to maintain a dispersed state in the electrode-forming slurry. A more preferable range is larger than 105 $m^2/g$ and less than 800 $m^2/g$, and a still more preferable range is larger than 110 $m^2/g$ and less than 700 $m^2/g$.

The first carbon nanotube preferably has a dibutyl phthalate (DBP) absorption D of 100 ml/100 g or more and 600 ml/100 g or less measured according to JIS K 6217-4. A conductive material having a DBP absorption D of less than 100 ml/100 g is not preferable because it is difficult to impart conductivity over a wide range. When the DBP absorption D is larger than 600 ml/100 g, this is not preferable because aggregates are unlikely to loosen and disperse. A more preferable range is 125 ml/100 g or more and 550 ml/100 g or less, and a still more preferable range is 150 ml/100 g or more and 500 ml/100 g or less.

The second carbon nanotube is not limited by the DBP absorption.

The first carbon nanotube preferably includes many oxygen-containing groups having hydrogen receptance (for example, hydroxy groups). When hydrogen receptive functional groups are included, hydrogen bonds are easily formed, and an electrode having a strong binding force can be obtained. Since a large number of hydrogen receptive functional groups leads to hydrophilicity, when the adsorption amount of water vapor is measured, it is possible to estimate the amount of hydrogen receptive functional groups. Specifically, the adsorption amount of water vapor per unit area, which is obtained by dividing the adsorption amount of water vapor at a relative pressure P/P0=0.3 by a BET specific surface area, is preferably $0.95 \times 10^{-3}$ mg/$m^2$ or more. The adsorption amount of water vapor per unit area is more preferably $1.00 \times 10^{-3}$ mg/$m^2$ or more, and still more preferably $1.05 \times 10^{-3}$ mg/$m^2$ or more. The adsorption amount of water vapor per unit area can be adjusted by oxidizing the conductive material. When the adsorption amount of water vapor is too large, this is not preferable because the conductivity is low.

The number of layers, the length and the diameter of the carbon nanotube can be confirmed and measured under a transmission electron microscope (TEM).

The conductive material is preferably composed of the first carbon nanotube having the first length and the second carbon nanotube having the second length larger than the first length.

However, the conductive material may contain a material other than the carbon nanotubes on the assumption that it contains the first carbon nanotubes and the second carbon nanotubes. Examples of materials other than the carbon nanotubes include conductive materials such as carbon black, titanium nitride, ruthenium oxide, and polythiophene.

In addition, the conductive material may not contain the first carbon nanotubes and the second carbon nanotubes. That is, the conductive material may include a first elongated carbon material having a first length and a second elongated carbon material having a second length larger than the first length. The first elongated carbon material and the second elongated carbon material each may be composed of one or more selected from among carbon nanotubes, graphene, carbon nanofibers, carbon nanocones, and the like.

The electrode active material-containing layer may contain other components in addition to the active material particles and the conductive material. The above other components refer to those added for producing an electrode-forming slurry, and are one or more materials other than the binder, for example, a polymer material such as a thickener for adjusting the viscosity of the electrode-forming slurry and a dispersant for dispersing the conductive material.

The electrode active material-containing layer having the above configuration does not contain an insulating binder such as PDVF or SBR, but contains a conductive material containing two carbon nanotubes having different lengths at a very high ratio, and thus the electrical resistance is low. In addition, since the weight ratio of active material particles in the electrode active material-containing layer is high, a lithium-ion rechargeable battery having a high capacity per weight of the electrode active material-containing layer, that is, a lithium-ion rechargeable battery having a high energy density, can be obtained. In addition, since the adhesion of the electrode active material-containing layer to the current collector is high, a lithium-ion rechargeable battery that can withstand a large current, that is, a lithium-ion rechargeable battery having a high output density, can be obtained.

[Method for Producing Positive Electrode for Lithium-Ion Rechargeable Battery]

A method for producing a positive electrode for a lithium-ion rechargeable battery according to the present embodiment includes a process of preparing a conductive material and a process of forming an electrode active material-containing layer.

First, a conductive material which includes a first elongated carbon material having a first length and a second elongated carbon material having a second length larger than the first length and has a ratio of the second length to the first length that is 2 or more and 50 or less is prepared.

In this case, an elongated carbon material dispersion solution in which the first elongated carbon material and the second elongated carbon material constituting the conductive material are dispersed can be prepared. The elongated carbon material dispersion solution contains, for example, first carbon nanotubes which are multi-walled carbon nanotubes, second carbon nanotubes which are single-walled carbon nanotubes, a dispersant, and a dispersion medium.

The elongated carbon material dispersion solution may not contain the first carbon nanotubes and the second carbon nanotubes. That is, the elongated carbon material dispersion solution may contain a first elongated carbon material having a first length, a second elongated carbon material having a second length larger than the first length, a dispersant, and a dispersion medium, and the first elongated carbon material and the second elongated carbon material each may be composed of one or more selected from among carbon nanotubes, graphene, carbon nanofibers, carbon nanocones, and the like.

The dispersion solution containing the above two types of carbon nanotubes (hereinafter also referred to as a carbon nanotube dispersion solution) preferably has a carbon nanotube content of 5 mass % or more. A low-concentration dispersion solution having a carbon nanotube content of less than 5 mass % is not preferable because, when an electrode slurry is prepared, the amount of a dispersion medium increases according to a desired amount of carbon nanotubes, the solid content concentration decreases, and application becomes difficult. It is industrially difficult to prepare a carbon nanotube dispersion solution having a carbon nanotube content of larger than 30 mass % because a large amount of a dispersant is required. A dispersion solution having a carbon nanotube content of 6 mass % or more and 27 mass % or less is more preferable, and a dispersion solution having a carbon nanotube content of 7 mass % or more and 25 mass % or less can be more preferably used.

The dispersion medium used in the carbon nanotube dispersion solution is preferably a polar aprotic solvent. When an aprotic polar solvent is used, the first carbon nanotubes and the second carbon nanotubes can easily balance dispersion in the solvent, adsorption on the surface of the electrode active material, and formation of a bundle structure with aggregation of carbon nanotubes. Therefore, since carbon nanotubes are uniformly distributed between active material particles and at the interface between active material particles and the current collector, electrodes having a strong binding force can be obtained. A most preferable aprotic polar dispersion medium is N-methylpyrrolidone, and in addition thereto, dimethylacetamide, dimethylformamide, dimethyl sulfoxide, acetonitrile, and the like may be exemplified.

The dispersant used in the carbon nanotube dispersion solution preferably includes many oxygen-containing groups having hydrogen receptance (for example, hydroxy groups). Specific examples thereof include carboxymethyl cellulose (CMC), polyvinyl alcohol (PVA), polyvinylpyrrolidone (PVP), and polyvinyl acetal (PBAc). The content of the dispersant with respect to carbon nanotubes is preferably 30 mass % or less and more preferably 25 mass % or less. When the content of the dispersant with respect to carbon nanotubes is larger than 30 mass %, this is not preferable because the content of the active material and the conductive material in the formed electrode is reduced.

The carbon nanotube dispersion solution preferably has a dynamic light scattering particle size (median diameter: $D_{50}$) of 400 nm or less, which is a behavior particle size of carbon nanotubes in the dispersion solution. A dispersion solution a dynamic light scattering particle size ($D_{50}$) of larger than 400 nm has poor dispersion, the carbon nanotubes form an aggregate and are easily precipitated, and dispersion stability is poor. Even if the dynamic light scattering particle size ($D_{50}$) is temporarily reduced by the dispersion treatment, since carbon nanotubes reaggregate to some extent in a hairball shape in the dispersion solution, the lower limit is about 100 nm. The dynamic light scattering particle size ($D_{50}$) which is a behavior particle size of carbon nanotubes in the dispersion solution is more preferably 120 nm or more and 390 nm or less, and still more preferably 150 nm or more and 380 nm or less.

The above dispersion solution containing the above two types of carbon nanotubes preferably has a dispersion solution viscosity of 5 mPa·s or more and 300 MPa·s or less at a shear rate 383 $s^{-1}$ although it depends on the type and amount of the dispersant and the carbon nanotube content. The dispersion solution in the present invention is a solution in which traces scooped from a container return to a smooth surface over time. When the viscosity is less than 5 mPa·s, this is not preferable because carbon nanotubes may not be sufficiently dispersed. Although it depends on applications, when the viscosity is higher than 300 MPa·s, this is not preferable because handling properties may deteriorate. The viscosity of the carbon nanotube dispersion solution is more preferably 5 mPa·s or more and 250 MPa·s or less, still more preferably 5 mPa·s or more and 200 MPa·s or less, and particularly preferably 10 mPa·s or more and 120 MPa·s or less.

The carbon nanotube dispersion solution can be prepared by appropriately selecting a method in which carbon nanotubes, a dispersant, and as necessary, a dispersant, are added to a dispersion medium, and then dispersed. Specifically, a bead mill, a jet mill, an ultrasonic dispersing machine or the like may be used.

Next, an electrode-forming material containing the conductive material and active material particles is applied to a current collector to form an electrode active material-containing layer.

In the present embodiment, an electrode active material-containing layer is formed using an electrode-forming material that does not contain a binder. In this case, an electrode-forming slurry can be produced by adding and mixing the conductive material, active material particles, and the electrode-forming dispersion medium. In addition, when the electrode-forming material is produced, the above carbon nanotube dispersion solution may be used. Examples of devices for mixing include a screw kneader, a ribbon mixer, a universal mixer, and a planetary mixer.

A method of applying the electrode-forming slurry to the current collector is not particularly limited, and known methods, for example, a metal mask printing method, an electrostatic coating method, a dip coating method, a spray coating method, a roll coating method, a doctor blade method, a gravure coating method, a screen printing method, and a die coating method, may be exemplified. A method in which bonding and drying are performed when hydrophilic groups are added to both the side of the active material layer and the side of the current collector may be exemplified. When a sheet after coating and drying is rolled, a flat plate press, a calender roll, or the like may be used. It is possible to produce an electrode for a lithium-ion rechargeable battery through each process.

[Method for Producing Lithium-Ion Rechargeable Battery]

A lithium-ion rechargeable battery according to the present embodiment includes the positive electrode for a lithium-ion rechargeable battery, a negative electrode, and an electrolyte.

The lithium-ion rechargeable battery can be obtained, for example, by disposing the positive electrode for a lithium-ion rechargeable battery and the negative electrode opposite each other with a separator therebetween and injecting an electrolytic solution. For the current collector on the side of the negative electrode, for example, an aluminum foil can be used.

The structure of the lithium-ion rechargeable battery is not particularly limited, but a structure in which a wound electrode group in which a positive electrode and a negative electrode molded in a band shape are spirally wound with a separator therebetween is inserted into a battery case and sealed and a structure in which a laminated electrode plate group in which a positive electrode and a negative electrode molded in a flat plate shape are sequentially laminated with a separator therebetween is enclosed in an exterior body are generally used. The lithium-ion rechargeable battery is used as, for example, a paper battery, a button battery, a coin battery, a laminated battery, a cylindrical battery, a square battery, or the like.

Regarding the separator, for example, a non-woven fabric, a cloth, and a microporous film which contain a polyolefin such as polyethylene and polypropylene as a main component or a combination thereof can be used. Here, in the case of the structure in which the positive electrode and the negative electrode of the produced lithium-ion rechargeable battery do not come into direct contact with each other, it is not necessary to use a separator.

Regarding the electrolyte used in the lithium-ion rechargeable battery, a known organic electrolytic solution, an inorganic solid electrolyte, and a polymer solid electrolyte can be used. Preferably, in consideration of electrical conductivity, an organic electrolytic solution is preferable. Generally, examples of organic electrolytic solutions include aprotic high dielectric constant solvents such as ethylene carbonate, propylene carbonate, butylene carbonate, and γ-butyrolactone, acetic acid esters such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolane, sulfolane, methyl sulfolane, acetonitrile, propionitrile, anisole, and methyl acetate and aprotic low viscosity solvents such as propionic acid esters. It is desirable to use these aprotic high dielectric constant solvents and aprotic low viscosity solvents together at an appropriate mixing ratio. In addition, ionic liquids using imidazolium, ammonium, and pyridinium cations can be used. The counter anion is not particularly limited, but ionic liquids such as $BF_4^-$, $PF_6^-$, and $(CF_3SO_2)_2N^-$ can be used by mixing with the above non-aqueous electrolytic solution solvent.

Examples of solutes for these solvents include lithium salts $LiPF_6$, $(CF_3SO_2)_2NLi$, $LiBF_4$, $LiClO_4$, $LiAsF_6$, $CF_3SO_3Li$, $C_4F_9SO_3Li$, $CF_3CO_2Li$, $(CF_3CO_2)_2NLi$, $C_6F_5SO_3Li$, $C_8Fl_7SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, and among these, any one may be used or two or more thereof may be used in combination.

Examples of polymer solid electrolytes include polyethylene oxide derivatives and polymers containing the derivatives, polypropylene oxide derivatives and polymers containing the derivatives, phosphate ester polymers, polycarbonate derivatives and polymers containing the derivatives. Here, members other than the above components, which are necessary for the battery configuration, are selected without any limitation.

[Connection Structure and Operation of Electrode Active Material-Containing Layer]

Figure 2:
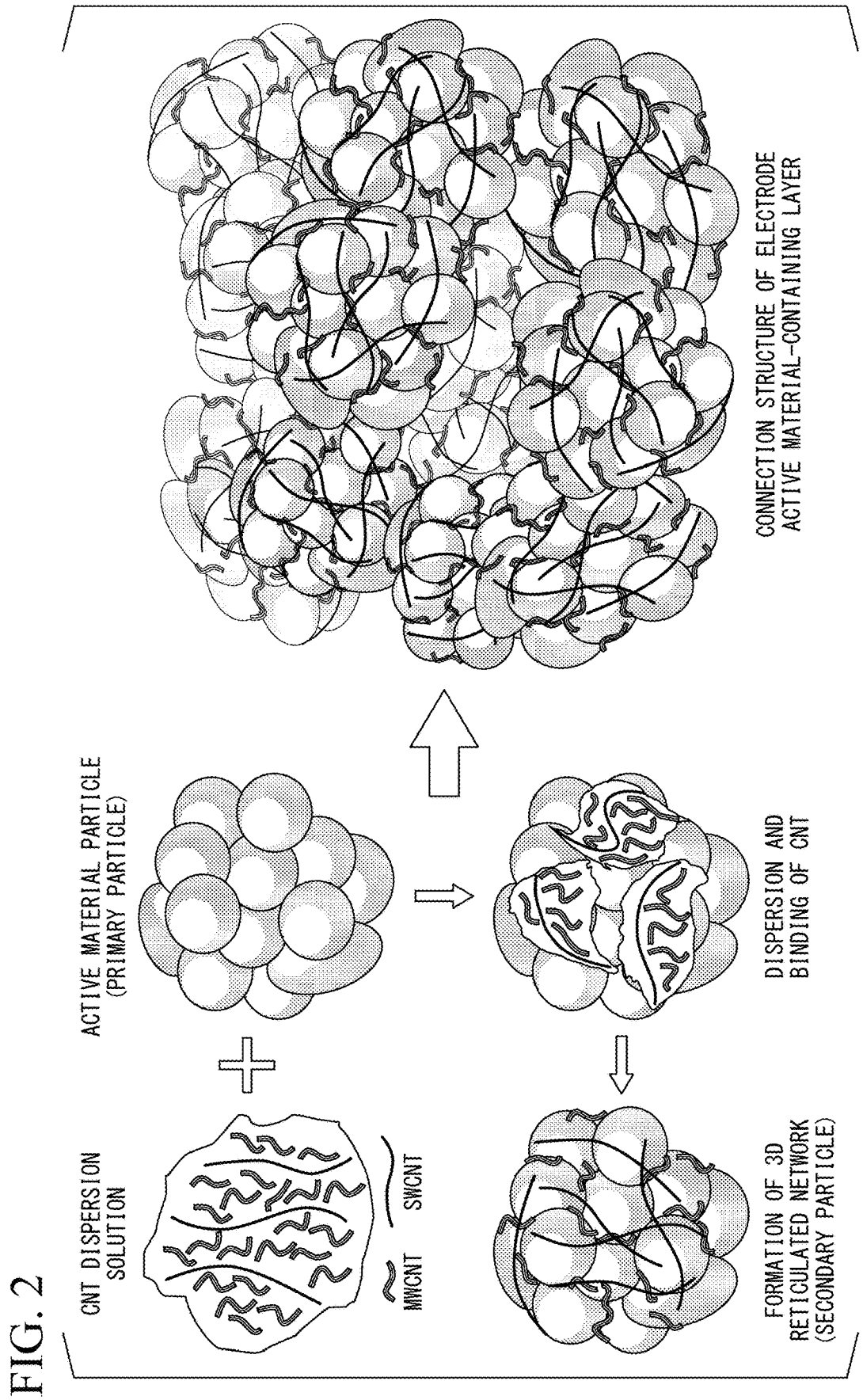
FIG. 2 is a schematic view illustrating details of a connection structure in the electrode active material-containing layer in FIG. 1.
Figure 3:
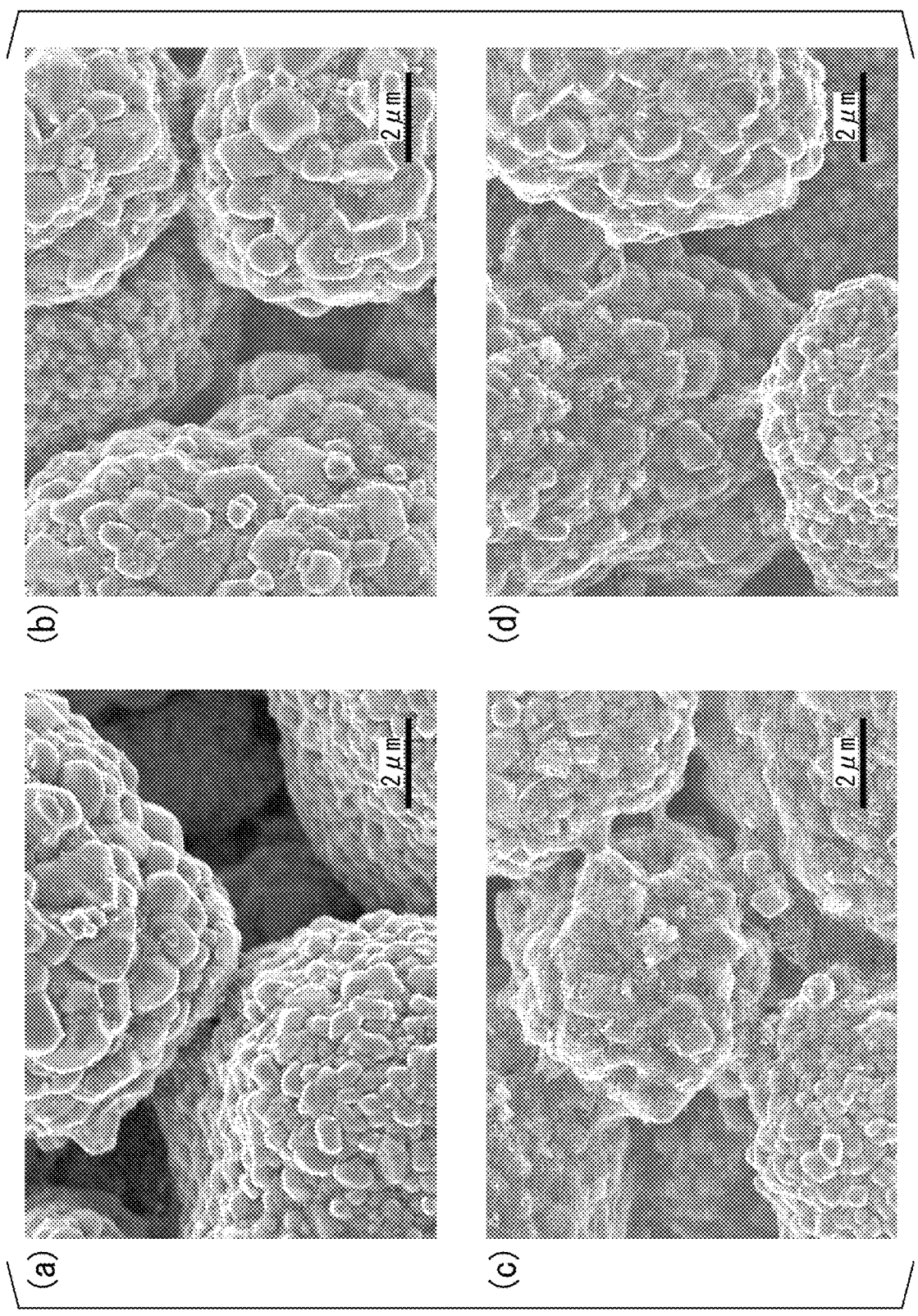
FIG. 3(a) shows an electron microscope image of an electrode active material-containing layer in Comparative Example 1.
FIG. 3(b) shows an electron microscope image of an electrode active material-containing layer in Example 1.
FIG. 3(c) is an electron microscope image of an electrode active material-containing layer in Example 2.
FIG. 3(d) is an electron microscope image of an electrode active material-containing layer in Example 3.

FIG. 2 is a schematic view illustrating details of a connection structure in the electrode active material-containing layer in FIG. 1. FIG. 2 shows an example in which a first elongated carbon material is composed of short first carbon nanotubes which are multi-walled carbon nanotubes and a second elongated carbon material is composed of elongated second carbon nanotubes which are single-walled carbon nanotubes.

As shown in FIG. 2, when a carbon nanotube dispersion solution containing the first and second carbon nanotubes at the above predetermined ratio and active material particles (primary particles) are mixed, the short first carbon nanotubes disperse and enter between a plurality of primary particles, and bind adjacent primary particles. That is, the first carbon nanotubes connect the plurality of primary particles of the electrode active material to each other.

In addition, the elongated second carbon nanotubes disperse and bind to a plurality of secondary particles. Therefore, the second carbon nanotubes are disposed to straddle a plurality of primary particles constituting a plurality of secondary particles and connect the secondary particles to each other.

Here, since the active material precursor is generally synthesized by a coprecipitation method, it has a form of secondary particles in which primary particles are aggregated. A lithium salt is dissolved in such a form of active material precursor to synthesize active material particles. In this case, the active material particles usually maintain their original secondary particle form. For an active material in the form of secondary particles, when a paste in which two types of carbon nanotubes having different lengths are mixed is prepared, and applied to an electrode, these carbon nanotubes self-aggregate and capture the active material particles to form a composite. In this case, short first carbon nanotubes (multi-walled carbon nanotubes) are selectively adsorbed in gaps between primary particles exposed on the surface of the active material particles in the form of secondary particles. In addition, excess first carbon nanotubes are supplied to gaps between the active material particles in the form of adjacent secondary particles and self-aggregate in a bundle form to form a network. On the other hand, elongated second carbon nanotubes (single-walled carbon nanotubes) are dispersed to straddle between primary particles exposed on the surface of the active material particles in the form of secondary particles, and adsorbed into the active material particles. Second carbon nanotubes that could not be adsorbed on the surface are supplied to gaps between adjacent secondary particles, self-aggregate in a bundle form together with short first carbon nanotubes to form a network.

That is, when containing short first carbon nanotubes and elongated second carbon nanotube at a predetermined ratio, primary particles are connected to each other by the short first carbon nanotubes, secondary particles are connected to each other by the elongated second carbon nanotubes, and thus 3D reticulated network of the first and second carbon nanotubes is formed. As a result, in the electrode active material-containing layer, a connection structure in which active material particles are firmly connected to each other via the first and second carbon nanotubes can be constructed.

In addition, the reason why the adhesion of the active material particles to the current collector is high and the electrical conductivity is improved even if the content of active material particles is increased to 99.7 mass % without using an insulating binder such as PVDF or SBR in the electrode active material-containing layer in the electrode for a lithium-ion rechargeable battery produced by the above method is inferred as follows.

Since the short first carbon nanotubes in the conductive material mainly connect adjacent active material particles to each other, an electron conduction path is formed between the adjacent active material particles, and a 3D reticulated network structure is formed on the current collector. According to such an operation of the first carbon nanotubes, the active material particles are held on the current collector without falling off from the electrode active material-containing layer.

One deterioration factor when the lithium-ion rechargeable battery is used for a long period is that active material particles physically deviate from the conduction path in the electrode. Above all, when the electrode active material-containing layer is peeled off from the current collector, this is fatal because a large amount of active material particles are separated from the conduction path. Therefore, the electrode active material-containing layer usually contains a binder for binding active material particles.

On the other hand, in the present invention, since the short first carbon nanotubes have a role of forming the reticulated network structure, it is possible to prevent the active material particles from being separated from the conduction path in the electrode. Therefore, it is possible to exhibit high adhesion between the active material particles and sufficient adhesion of the active material particles to the current collector without containing a binder in the electrode active material-containing layer.

In addition, since the elongated second carbon nanotubes in the conductive material connect not only adjacent active material particles but also other active material particles located therearound, compared to when the carbon nanotubes contained in the conductive material are composed of only first carbon nanotubes, a continuous electron conduction path with low resistance is formed between more active material particles. According to such an operation of the second carbon nanotubes, the electrical conductivity is significantly improved.

In this manner, since the short first carbon nanotubes have a role of forming the reticulated network structure, the active material particles are mechanically connected to each other, and sufficient adhesion of the active material particles to the current collector can be exhibited. In addition, since the elongated second carbon nanotubes have a role of forming a continuous electron conduction path with low resistance, compared to when the carbon nanotubes are composed of only the short first carbon nanotube, the active material particles are electrically connected to each other, and the electrical conductivity in the electrode active material-containing layer is dramatically improved. In addition, since it is not necessary to incorporate a binder into the electrode active material-containing layer by causing the short first carbon nanotubes to bind the active material particles to each other, a very high proportion of the active material particles can be contained in the electrode active material-containing layer.

In addition, a carbon material with high crystallinity is described as an aggregate of graphene sheets composed of only carbon. Although ends and defects of the graphene sheet are usually terminated with hydrogen, they have high activity and are easily replaced with functional groups depending on the surrounding environment. For example, when carbon nanotubes in which graphene sheets are formed in a cylindrical shape are dispersed in water, if the carbon nanotubes are cut and shortened, the ends are modified with hydroxy groups derived from water due to the activity of the cut surface. Therefore, carbon nanotubes with a constriction have a larger active surface generated in water and thus hydrophilic groups are more likely to adhere thereto.

In this manner, when hydrophilic groups on fibrous carbon nanotubes form hydrogen bonds with hydrophilic groups on other carbon nanotubes and hydrophilic groups on the surface of the current collector, the plurality of carbon nanotubes form a network fixed to the current collector, and the active material particles can be held without falling off from the electrode active material-containing layer.

EXAMPLES

Hereinafter, examples of the present invention will be described. The present invention is not limited to the following examples.

Examples 1 to 3

Multi-walled carbon nanotubes (first CNT, product name "TCW-261" commercially available from Toda Kogyo Corporation) and single-walled carbon nanotubes (second CNT, product name "eDIPSEC1.5n commercially available from Meijo Nano Carbon) were mixed so that the mass ratio of multi-walled carbon nanotubes:single-walled carbon nanotubes had values shown in Table 1, and thereby conductive materials were prepared. In the state before mixing, the first CNTs had a length of 0.3 μm or more and 0.7 μm or less and an average length of 0.5 μm, and the second CNTs had a length of 5 μm or more and 10 μm or less, and an average length of 7 μm. The obtained conductive material, an electrode-forming dispersion medium, and NCM523 (nickel cobalt manganese lithium) as active material particles were mixed to prepare an electrode-forming material, and the electrode-forming material was applied to an aluminum foil and dried to produce a positive electrode for a lithium-ion rechargeable battery.

Comparative Example 1

A positive electrode for a lithium-ion rechargeable battery was produced in the same manner as in Example 1 except that the conductive material included only multi-walled carbon nanotubes and only multi-walled carbon nanotubes (MWCNT) constituting the first CNT were used, Examples 4 to 6

Multi-walled carbon nanotubes and single-walled carbon nanotubes (SWCNT) were mixed so that the mass ratio of multi-walled carbon nanotubes:single-walled carbon nanotubes had values shown in Table 1, and thereby conductive materials were prepared. The obtained conductive material, an electrode-forming dispersion medium, and NCM523 (nickel-cobalt-manganese-lithium) as active material particles were mixed to prepare an electrode-forming material, and the electrode-forming material was applied to an aluminum foil to produce a positive electrode for a lithium-ion rechargeable battery.

Comparative Example 2

A positive electrode for a lithium-ion rechargeable battery was produced in the same manner as in Example 4 except that the conductive material included only multi-walled carbon nanotubes and only the multi-walled CNTs constituting the first CNT were used.

Examples 7 to 9

Positive electrodes for a lithium-ion rechargeable battery were produced in the same manner as in Examples 1 to 3 except that the active material particles were replaced with NCA (layered structure $LiNi_{0.82}Al_{0.03}Co_{0.15}O_2$).

Comparative Example 3

A positive electrode for a lithium-ion rechargeable battery was produced in the same manner as in Comparative Examples 1 and 2 except that the active material particles were replaced with NCA (layered structure $LiNi_{0.82}Al_{0.03}Co_{0.15}O_2$).

The positive electrodes for a lithium-ion rechargeable battery of Examples 1 to 9 and Comparative Examples 1 to 3 were measured and evaluated by the following methods.

[Method of Observing Surface of Electrode]

For Examples 1 to 3 and Comparative Example 1, small pieces of electrode samples were fixed on a sample stand and observed at 10 kV using an SEM (JSM7600F commercially available from JEOL Ltd.). The presence or absence of PDVF or SBR could be determined by analyzing the cross section of the electrode (The TRC News No. 117(2013)). FIG. 3(a) to FIG. 3(d) show electron microscope images of the obtained electrode active material-containing layer. Examples 1 to 3 corresponded to FIG. 3(b) to FIG. 3(d), and Comparative Example 1 corresponded to FIG. 3(a).

Based on these observation results, it was found that a large number of fibrous single-walled CNTs were present on the surface of the active material particles as the content of single-walled CNTs increased, and more active material particles were connected by single-walled CNTs.

[Measurement of Ratio of (Length of Second CNT)/(Length of First CNT)]

Isolated and dispersed first CNTs and second CNTs were observed using a transmission electron microscope (TEM), and the ratio of (length of second CNT)/(length of first CNT) was determined. The results are shown in Table 1.

[Production of Battery and Electrochemical Measurement of the Battery]

Electrochemical measurement was performed on a counter electrode Li R2032 half cell using a thermostatic device (SU-221 commercially available from Espec Corporation) under a room temperature environment.

[Production of Half Cell]

First, in a dry argon atmosphere with a dew point of −80° C. or lower, between a coin cell cap and a case, a 14 mmφ electrode and a 14 mmφ metal lithium foil were laminated with a separator (commercially available from Celgard LLC #2500) therebetween. Next, an appropriate amount of an electrolytic solution (obtained by dissolving an electrolyte $LiPF_6$ at a concentration of 1 mol/L in a mixture of EC (ethylene carbonate) and DMC (dimethyl carbonate) at a ratio of 3:7 was used as a solvent) was added to this laminate, and crimping was performed using a manual coin cell crimping machine (commercially available from Hohsen Corporation) to obtain a half cell.

TABLE 1

| | Configuration of electrode active material-containing layer | | | Configuration of conductive material | | | | | | |
|---|---|---|---|---|---|---|---|---|---|---|
| | Type of active material particle | Content of active material particle [weight %] | Conductive material [weight %] | Configuration of first CNT | Configuration of second CNT | Content of first CNT [weight %] | Content of second CNT [weight %] | Length of first CNT [μm] | Length of second CNT [μm] | (Length of second CNT)/(length of first CNT) [—] |
| Comparative Example 1 | NCM | 99 | 1 | MWCNT | None | *1* | *0* | *0.3 to 0.7* | — | — |
| Example 1 | NCM | 99 | 1 | MWCNT | SWCNT | 0.99 | 0.01 | 0.3 to 0.7 | 0.5 to 10 | 7.1 to 33.3 |
| Example 2 | NCM | 99 | 1 | MWCNT | SWCNT | 0.95 | 0.05 | 0.3 to 0.7 | 0.5 to 10 | 7.1 to 33.3 |
| Example 3 | NCM | 99 | 1 | MWCNT | SWCNT | 0.9 | 0.1 | 0.3 to 0.7 | 0.5 to 10 | 7.1 to 33.3 |
| Comparative Example 2 | NCM | 99.5 | 0.5 | MWCNT | None | *0.5* | *0* | *0.3 to 0.7* | — | — |
| Example 4 | NCM | 99.5 | 0.5 | MWCNT | SWCNT | 0.45 | 0.05 | 0.3 to 0.7 | 0.5 to 10 | 7.1 to 33.3 |
| Example 5 | NCM | 99.5 | 0.5 | MWCNT | SWCNT | 0.44 | 0.06 | 0.3 to 0.7 | 0.5 to 10 | 7.1 to 33.3 |
| Example 6 | NCM | 99.5 | 0.5 | MWCNT | SWCNT | 0.425 | 0.075 | 0.3 to 0.7 | 0.5 to 10 | 7.1 to 33.3 |
| Comparative Example 3 | NCA | 99 | 1 | MWCNT | None | *1* | *0* | *0.3 to 0.7* | — | — |
| Example 7 | NCA | 99 | 1 | MWCNT | SWCNT | 0.99 | 0.01 | 0.3 to 0.7 | 0.5 to 10 | 7.1 to 33.3 |
| Example 8 | NCA | 99 | 1 | MWCNT | SWCNT | 0.95 | 0.05 | 0.3 to 0.7 | 0.5 to 10 | 7.1 to 33.3 |
| Example 9 | NCA | 99 | 1 | MWCNT | SWCNT | 0.9 | 0.1 | 0.3 to 0.7 | 0.5 to 10 | 7.1 to 33.3 |

Note)
Italic and bold numbers indicate beyond the scope of the present invention

[Initial Charging and Discharging Characteristics of Positive Electrode and Evaluation of Rate Characteristics]

The produced half cell was set in a potentiometer galvanostat (battery charging and discharging device "HJ1020Msd8" commercially available from Hokuto Denko Corporation), and Li was inserted into and removed from the positive electrode in a range of 2.8 V to 4.3 V. For charging, constant current charging (CC charging) was performed at 0.2C, and for discharging, constant current discharging (CC discharging) was performed at 0.2C, 0.5C, 1C, 3C, 5C, 10C, and 0.2C in that order while changing the discharging rate every three times. The results are shown in FIG. 4(a) to FIG. 4(b) and FIG. 5(a) to FIG. 5(b).

[Measurement of Electrical Conductivity of Positive Electrode]

Figure 6:
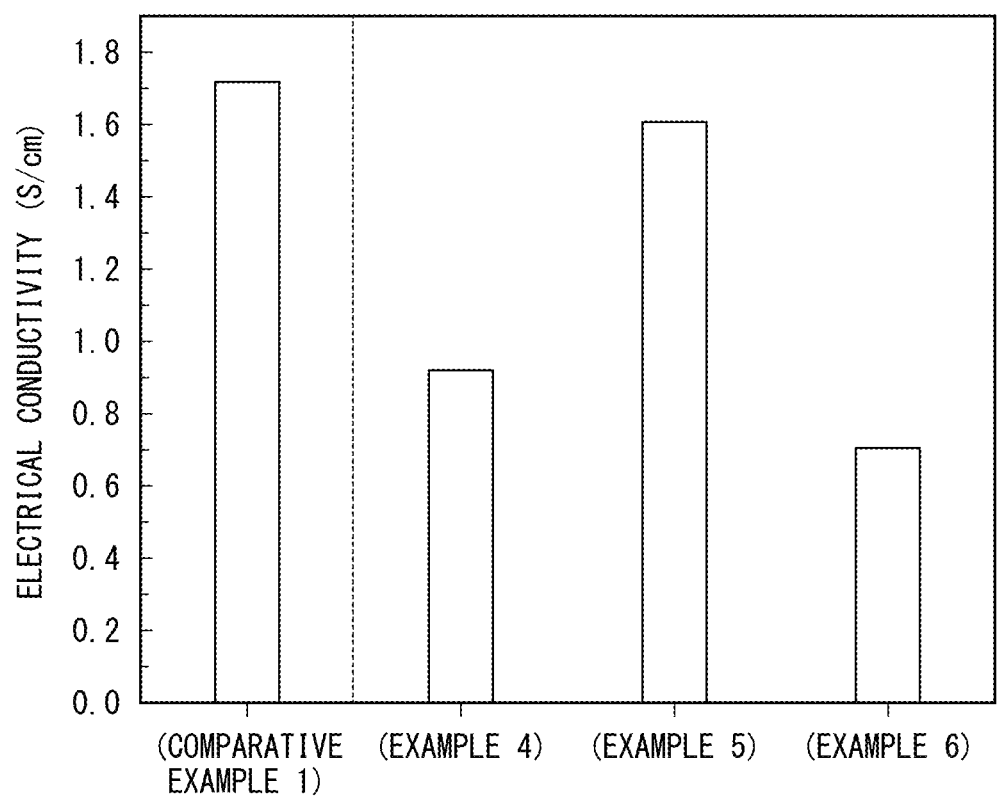
FIG. 6 is a graph showing the electrical conductivity of positive electrodes for a lithium-ion rechargeable battery in Examples 4 to 6 and Comparative Example 1.

The electrical conductivities of the positive electrodes in Examples 4 to 6 and Comparative Example 1 were determined using a four-point probe instrument (K-705RS commercially available from Kyowa Riken Co., Ltd.). The results are shown in FIG. 6.

[Evaluation of Ion Diffusion]

Figure 7:
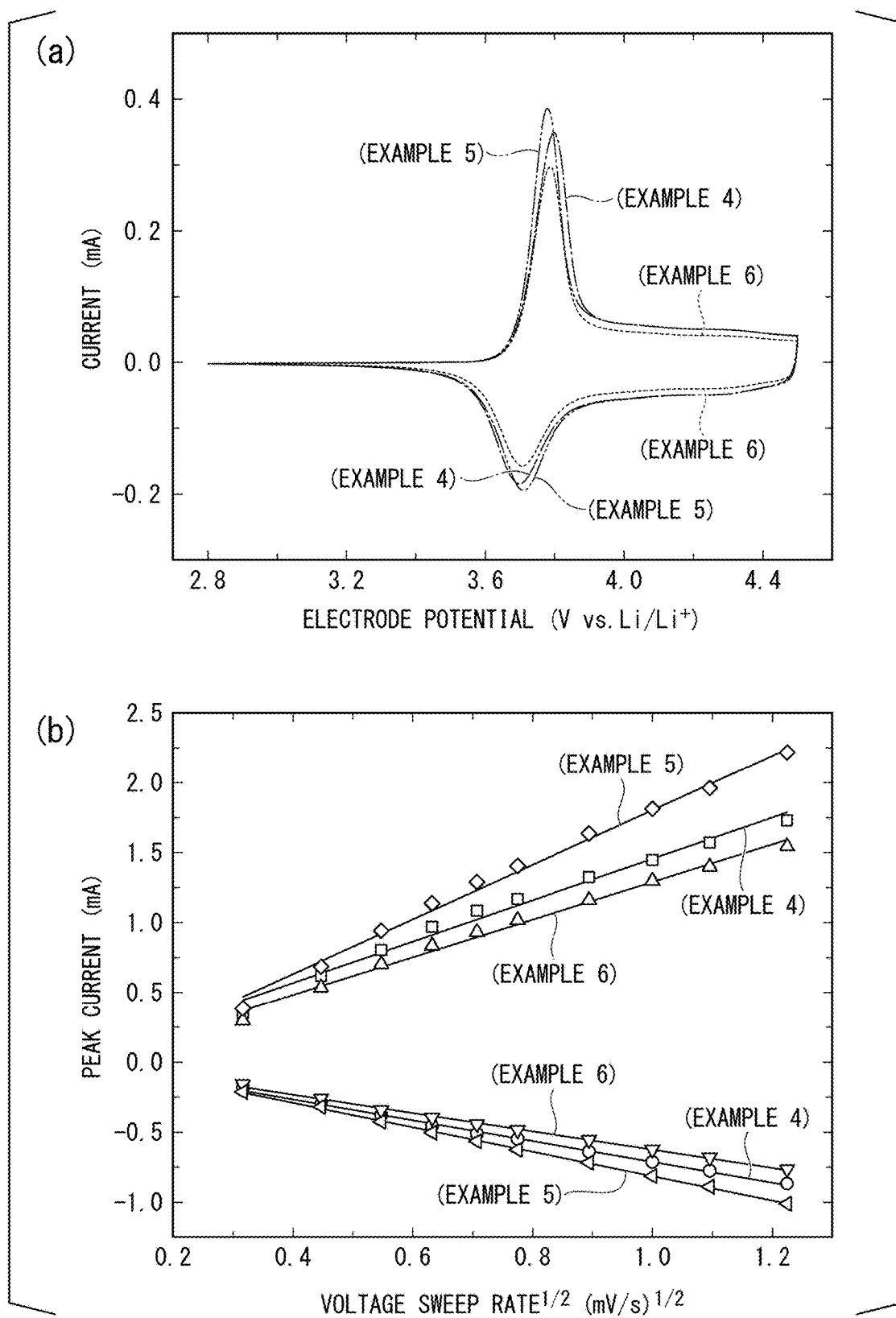
FIG. 7(a) is an example of current-potential curves (cyclic voltammogram) of positive electrodes for a lithium-ion rechargeable battery in Examples 4 to 6.
FIG. 7(b) is a graph showing the relationship between a scan rate and a current.

The potential was swept using a potentiometer galvanostat (battery charging and discharging device "HJ1020Msd8" commercially available from Hokuto Denko Corporation), and the peak potential was determined from a cyclic voltammogram. The sweep rate was 0.1 mV/s. The results are shown in FIG. 7(a) and Table 2. In addition, by changing the sweep rate, the peak current $I_p$ was determined using the Cottrell equation, the horizontal axis shows ½ power of the sweep rate v, the vertical axis shows the peak current $I_p$, the diffusion coefficient of lithium ions was calculated from the slope of a straight line. The results are shown in FIG. 7(b).

positive electrode was 0.05 weight % (Example 2), the discharging capacity became the maximum value.

It was inferred that, when the content of single-walled CNTs was 0.1 weight % (Example 3), the content of multi-walled CNTs was reduced to 0.9 weight %, a 3D reticulated network structure due to multi-walled CNTs was not sufficiently formed, and the discharging capacity decreased due to decrease in the active material particle utilization rate.

Figure 5:
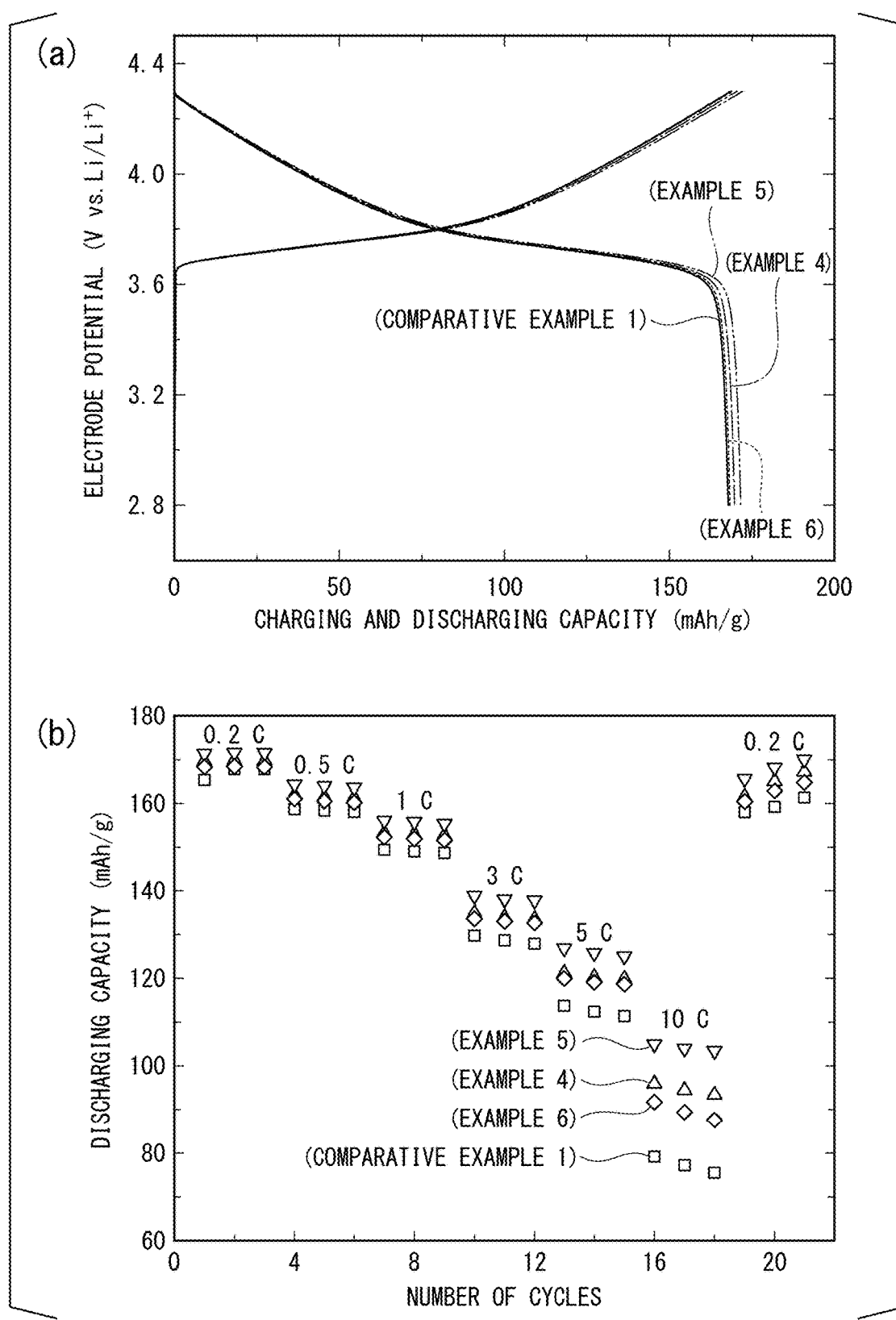
FIG. 5(a) is a graph showing an example of charging and discharging curves of lithium-ion rechargeable batteries in Examples 4 to 6 and Comparative Example 1.
FIG. 5(b) is a graph showing the relationship between the number of cycles and a discharging capacity.

In addition, based on the results in FIG. 5(a) and FIG. 5(b), it was found that, in Examples 4 to 6 containing 99.5 mass % of NCM523, a part of the conductive material contained elongated single-walled CNTs, and the discharging capacity increased compared to Comparative Example 1.

Comparing Examples 4 to 6, it was found that, when the content of single-walled CNTs contained in the positive electrode was 0.06 weight % (Example 5), the discharging capacity became the maximum value. It was inferred that, when the content of single-walled CNTs was 0.075 weight % (Example 67), the content of multi-walled CNTs was reduced to 0.425 weight %, a 3D reticulated network structure due to multi-walled CNTs was not sufficiently formed, and the discharging capacity decreased due to decrease in the active material particle utilization rate.

In addition, based on the results in FIG. 6, it was found that, in Examples 4 to 6 containing 99.5 weight % of active material particles (NCM523), compared to Comparative Example 1 containing 99 weight % of active material particles (NCM523), although the electrical conductivity was low, almost the same electrical conductivity as in Comparative Example 1 was obtained when the content of single-walled CNTs was 0.06 weight % (Example 5).

TABLE 2

| | Peak potential | | | Diffusion coefficient | |
| --- | --- | --- | --- | --- | --- |
| | Oxidation wave [V] | Reduction wave [V] | Potential difference (polarization) [V] | Delithiation reaction [cm²/s] | Lithiation reaction [cm²/s] |
| Comparative Example 1 | 3.868 | 3.648 | 0.219 | 7.34*10⁻¹⁰ | 2.60*10⁻¹⁰ |
| Example 4 | 3.798 | 3.695 | 0.102 | 2.99*10⁻⁹ | 7.55*10⁻⁹ |
| Example 5 | 3.799 | 3.710 | 0.069 | 5.21*10⁻⁹ | 1.04*10⁻⁹ |
| Example 6 | 3.787 | 3.705 | 0.082 | 2.47*10⁻⁹ | 5.84*10⁻⁹ |

[Evaluation of Cycle Characteristics of Positive Electrode]

The produced half cell was set in a charging and discharging device (battery charging and discharging device "HJ1020Msd8" commercially available from Hokuto Denko Corporation), and Li was inserted into and removed from the positive electrode in a voltage range of 2.8 V to 4.3 V.

Figure 8:
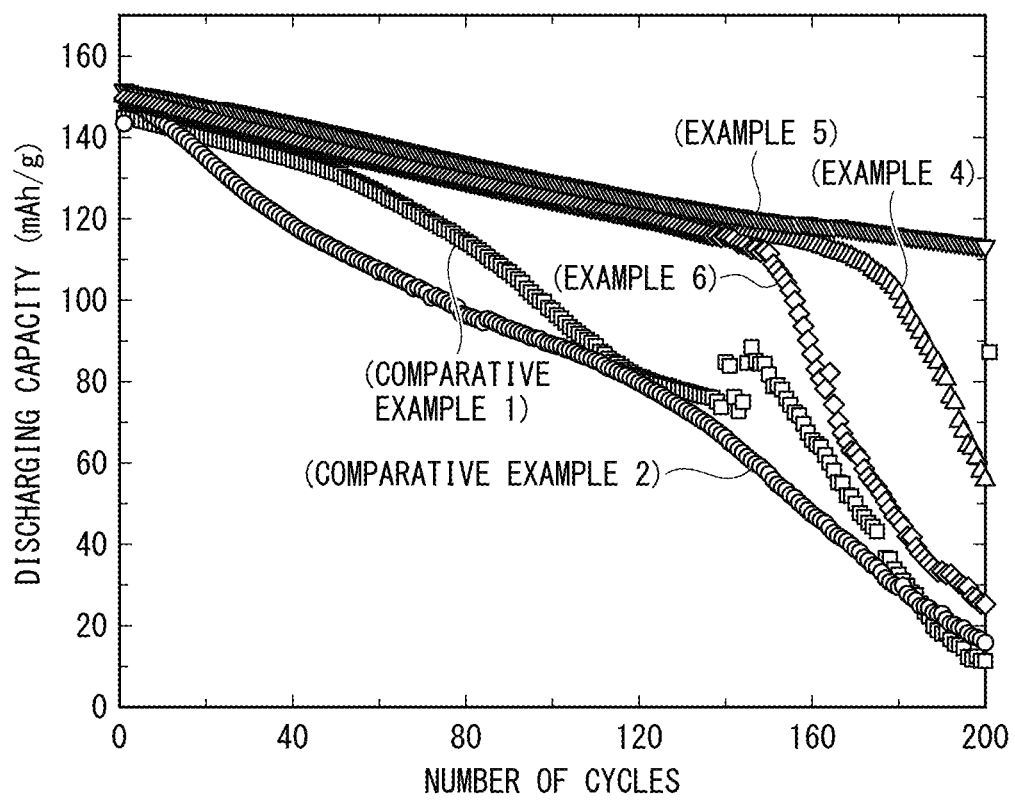
FIG. 8 is a graph showing an example of cycle characteristics of positive electrodes for a lithium-ion rechargeable battery in Examples 4 to 6 and Comparative Examples 1 and 2.

For charging and discharging, constant current charging (CC charging) and constant current discharging (CC discharging) were performed at 1C. Then, this charging and discharging was repeated 200 times, and the discharging capacity in this case was measured. The results are shown in FIG. 8.

Figure 4:
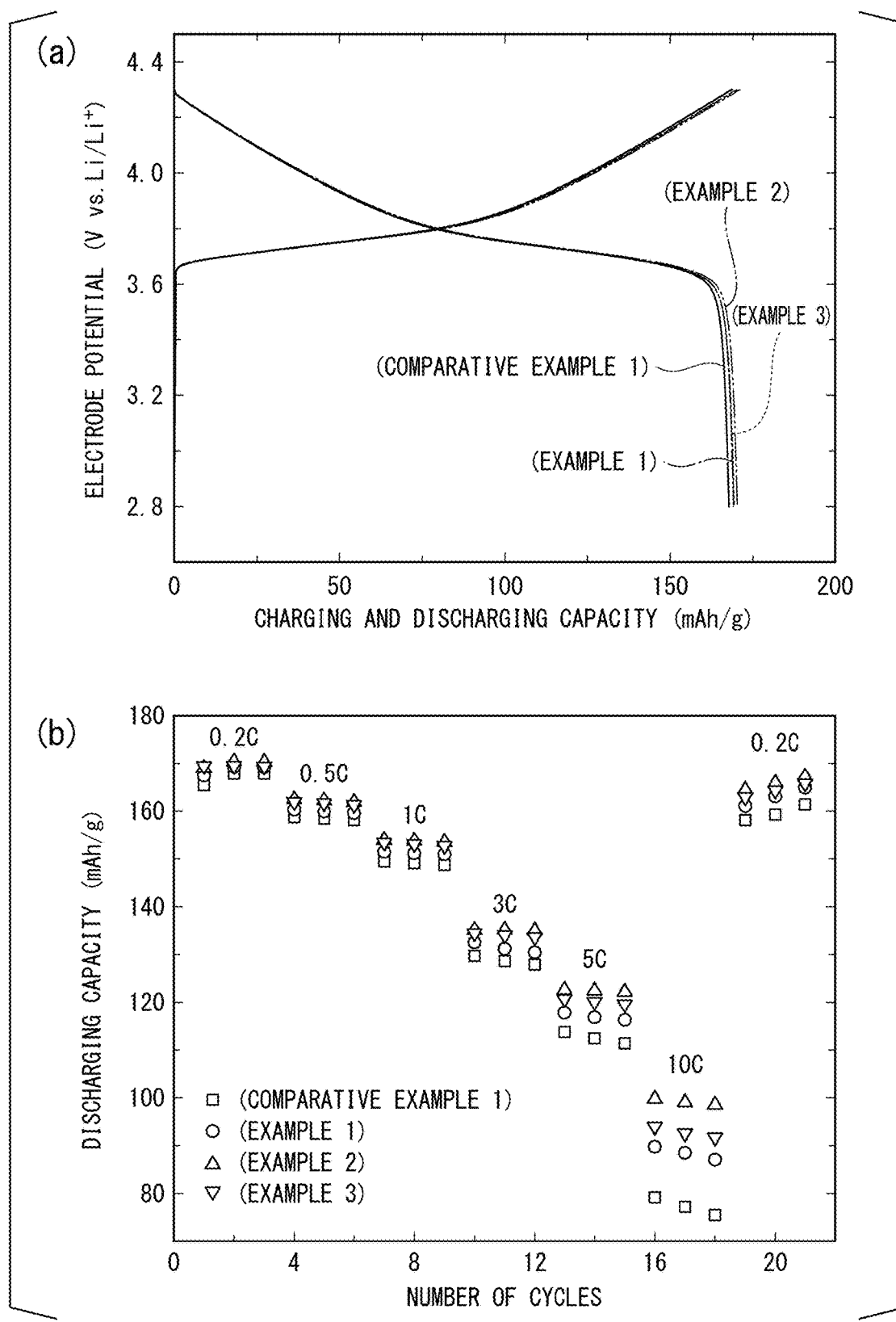
FIG. 4(a) is a graph showing an example of charging and discharging curves of lithium-ion rechargeable batteries in Examples 1 to 3 and Comparative Example 1.
FIG. 4(b) is a graph showing the relationship between the number of cycles in which a charging and discharging test is repeatedly performed under conditions of different current densities and a discharging capacity.

First, based on the results in FIG. 4(a) and FIG. 4(b), it was found that, in all of Examples 1 to 3 containing 99 weight % of active material particles (NCM523), a part of the conductive material contained elongated single-walled CNTs, and the discharging capacity increased compared to Comparative Example 1.

In addition, comparing Examples 1 to 3, it was found that, when the content of single-walled CNTs contained in the In addition, in Example 5, although the content of first CNTs was lower than that of Comparative Example 1, and the content of second CNTs was larger than that of Example 1, the electrical conductivity was lower than that of Comparative Example 1. In addition, in Example 6, although the content of first CNTs was lower than that of Example 5 and the content of second CNTs was larger than that of Example 5, the electrical conductivity was lower than that of Comparative Example 1. Based on these results, it was inferred that the average electron conductivity inside the electrode was dominated more by the connection structure of the CNT network formed by the compositing of each CNT and active material particles than by the electron conductivity of CNTs with different first and second lengths. In addition, it was found that the mass ratio of the first CNTs and the second CNTs greatly affected the electrical conductivity, and even if the mass ratio of the conductive material (CNT) to the electrode active material-containing layer was the same, the electrical conductivity greatly differed if the coexistence ratio (mass ratio) of the first CNTs and the second CNTs was different.

In addition, it was inferred that, in order to stably and uniformly form the CNT network inside the electrode, short first CNTs had an important role, and additionally, due to coexistence of elongated single-walled CNTs, a self-aggregate of first CNTs was induced between more active material particles, and a continuous electron conduction path with low resistance was formed.

In addition, based on the results in FIG. 7(a) and Table 2, it was found that, in all of Examples 4 to 6, compared to Comparative Example 1, the peak potential of oxidation waves was high and the potential difference (polarization) from the reduction wave peak was small. In addition, comparing Examples 4 to 6, it was found that, when the content of single-walled CNTs contained in the positive electrode was 0.06 weight % (Example 5), the peak potential on the side of the positive electrode became the maximum value, and the polarization became a minimum.

In addition, based on the results in FIG. 7(b) and Table 2, it was found that, in all of Examples 4 to 6, compared to Comparative Example 1, the slope of the straight line on both the charging side and the discharging side was large and the redox species diffusion coefficient was large. Based on these results, it was found that there was an optimal range for the coexistence ratio of the short first CNTs and elongated second CNTs in compositing with the active material particles, and the amount of the short first CNTs used could be reduced by the elongated second CNTs. The lower limit range was determined by the minimum amount required to form the CNT network with the first CNTs.

In addition, based on the results in FIG. 8, it was found that, in all of Examples 4 to 6, compared to Comparative Examples 1 and 2, the decrease in the discharging capacity from the initial discharging capacity was small and deterioration could be reduced. In particular, it was found that, in the number of cycles of 90 to 140, compared to Comparative Examples 1 and 2, the decrease in the discharging capacity from the initial discharging capacity was remarkably small, and the battery characteristics were dramatically improved. In addition, comparing Examples 4 to 6, it was found that, when the content of the single-walled CNTs contained in the positive electrode was 0.06 weight % (Example 5), the decrease in the discharging capacity was the smallest and deterioration could be minimized.

In addition, as shown in Table 1, in Examples 7 to 9 and Comparative Example 3, it was found that, when NCA (layered structure $LiNi_{0.82}Al_{0.03}Co_{0.15}O_2$) was used for the active material particles, the same characteristics as when NCM523 was used were obtained.

Figure 9:
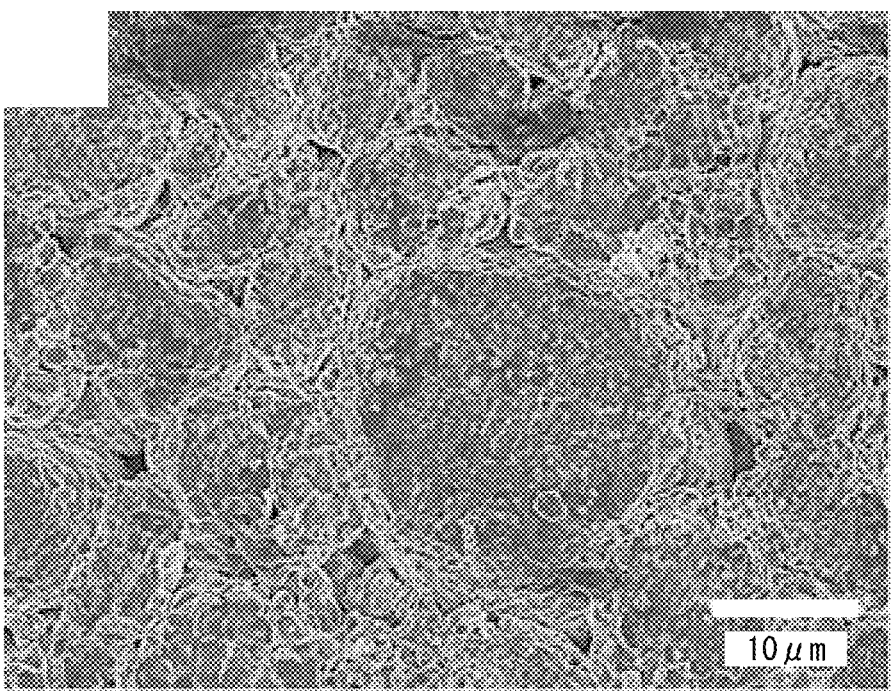
FIG. 9(a) is an electron microscope image of an electrode active material-containing layer in Example 5 after a cycle test is performed.
FIG. 9(b) is an enlarged image thereof.
Figure 9:
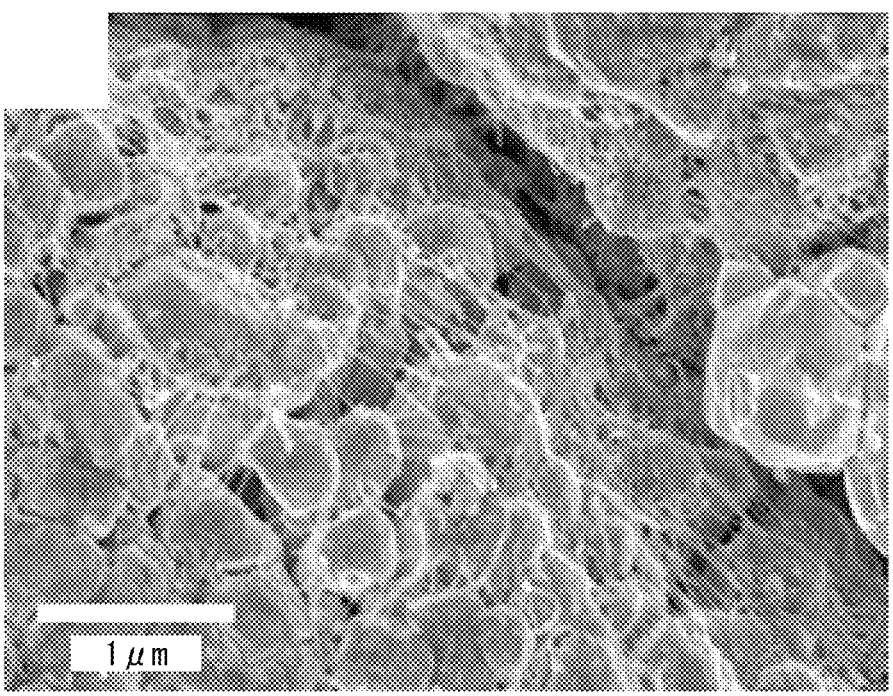

FIG. 9(a) is an electron microscope image of an electrode active material-containing layer in Example 5 after a cycle test was performed, and FIG. 9(b) is an enlarged image thereof. In Example 5, the mass ratio of short first CNTs: elongated second CNTs was 88:12.

As shown in FIG. 9(a) and FIG. 9(b), it was found that, in Example 5, primary particles of the electrode active material were connected by (multi-walled) short first CNTs to form secondary particles and the secondary particles were connected to each other by (single-walled) elongated second CNTs. Therefore, in the configuration of Example 5, it was confirmed that short first CNTs and elongated CNTs formed a 3D reticulated network structure and thus the active material particles were firmly bonded to each other.

Figure 10:
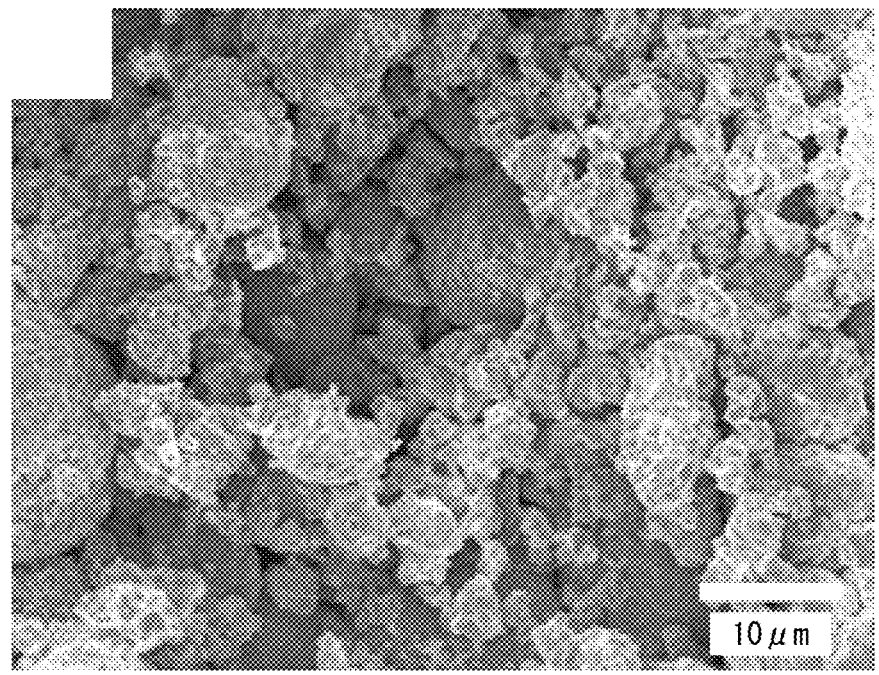
FIG. 10 is an electron microscope image of an electrode active material-containing layer in Comparative Example 1 after a cycle test is performed.

On the other hand, FIG. 10 is an electron microscope image of an electrode active material-containing layer in Comparative Example 1 after a cycle test was performed. In Comparative Example 1, only short first CNTs were used and no (single-walled) elongated second CNTs were used.

As shown in FIG. 10, in Comparative Example 1, a plurality of large voids were formed between the particles of the electrode active material. Therefore, in Comparative Example 1, it was found that the layered structure of the electrode active material was destroyed due to expansion and contraction resulting from repeated charging and discharging.

Figure 11:
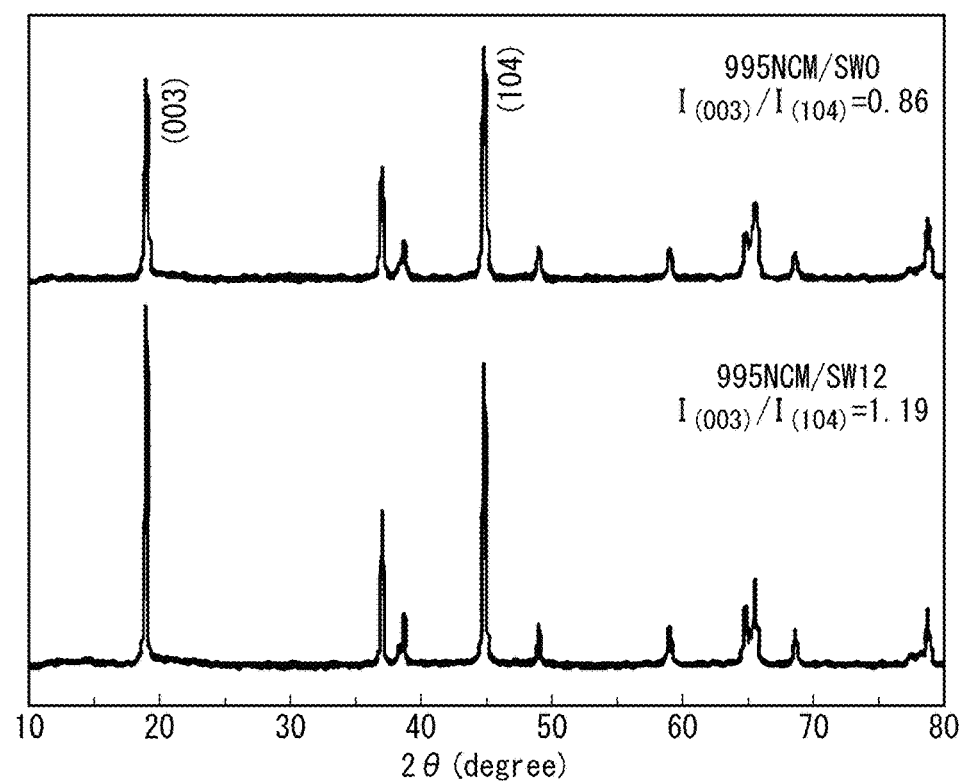
FIG. 11 is a diagram showing XRD patterns in Example 5 and Comparative Example 1 after a cycle test is performed.

FIG. 11 is a diagram showing XRD patterns in Example 5 and Comparative Example 1 after a cycle test was performed. In FIG. 11, I(003) indicates a peak intensity corresponding to the layered rock salt structure of the electrode active material, and I(104) indicates a peak intensity corresponding to the rock salt structure of the electrode active material. The XRD pattern was measured using an X-ray diffraction device (device name "MiniFlex-II" commercially available from Rigaku Corporation).

As can be clearly understood from FIG. 11, the peak intensity ratio of I(003)/I(104) of Example 5 was 1.19, the peak intensity ratio of Comparative Example 1 was 0.86, and the peak intensity ratio of Example 5 was larger than the peak intensity ratio of Comparative Example 1. Therefore, when charging and discharging were repeated, if the electrode active material-containing layer contained short first CNTs and elongated second CNTs at a predetermined ratio, a layered rock salt structure in which atomic arrangements of transition metals such as Li and Ni were stacked in layers was maintained in the electrode active material and the decrease in the discharging capacity during repeated charging and discharging could be reduced.

On the other hand, it was found that, when only the short first CNTs were contained and the elongated second CNTs were not contained, the layered rock salt structure of the electrode active material was destroyed and changed to a rock salt structure in which atomic arrangements of Li and transition metals were randomly disordered, and thus the decrease in the discharging capacity during repeated charging and discharging was large.

The invention claimed is:

1. A positive electrode for a lithium-ion rechargeable battery, comprising:
   a current collector; and
   an electrode active material-containing layer provided on the current collector,
   wherein the electrode active material-containing layer contains active material particles and a conductive material that connects the active material particles to each other;
   wherein the mass ratio of the active material particles:the conductive material:other components in the electrode active material-containing layer is 95 to 99.7:0.3 to 5:0 to 1,
   wherein the conductive material includes a first elongated carbon material having a first length and a second elongated carbon material having a second length larger than the first length,
   wherein the ratio of the second length to the first length is 2 or more and 50 or less
   wherein the first elongated carbon material connects a plurality of primary particles constituting one secondary particle in the active material particles and connects a plurality of primary particles constituting adjacent secondary particles to each other, and
   wherein the second elongated carbon material is disposed to straddle between a plurality of primary particles constituting a plurality of secondary particles in the active material particles and connects the secondary particles to each other,
wherein the first elongated carbon material is composed of first carbon nanotubes which are multi-walled carbon nanotubes,
wherein the second elongated carbon material is composed of second carbon nanotubes which are single-walled carbon nanotubes, and
wherein the mass ratio of the first carbon nanotubes:the second carbon nanotubes is 85 to 99:1 to 15.

2. A lithium-ion rechargeable battery comprising the positive electrode for a lithium-ion rechargeable battery according to claim 1, a negative electrode, and an electrolyte.

3. A method for producing a positive electrode for a lithium-ion rechargeable battery, comprising:
a process of preparing a conductive material which includes a first elongated carbon material having a first length and a second elongated carbon material having a second length larger than the first length and has a ratio of the second length to the first length that is 2 or more and 50 or less; and
a process of forming an electrode active material-containing layer by applying an electrode-forming material containing the conductive material and active material particles to a current collector,
wherein the first elongated carbon material is composed of first carbon nanotubes which are multi-walled carbon nanotubes,
wherein the second elongated carbon material is composed of second carbon nanotubes which are single-walled carbon nanotubes, and
wherein the mass ratio of the first carbon nanotubes:the second carbon nanotubes is 85 to 99:1 to 15.

4. The method for producing a positive electrode for a lithium-ion rechargeable battery according to claim 3,
wherein the electrode active material-containing layer is formed using an electrode-forming material that does not contain a binder.

* * * * *